United States Patent [19]
Minowa et al.

[11] Patent Number: 5,982,958
[45] Date of Patent: Nov. 9, 1999

[54] OPTICAL WAVEGUIDE MODULATOR DEVICE

[75] Inventors: Junichiro Minowa; Tohru Sugamata; Shinichi Shimotsu, all of Funabashi, Japan

[73] Assignee: Sumitomo Osaka Cement Co., Ltd., Tokyo, Japan

[21] Appl. No.: 08/865,683

[22] Filed: May 30, 1997

[30] Foreign Application Priority Data

Jun. 14, 1996 [JP] Japan ................................. 8-154029

[51] Int. Cl.⁶ ...................................................... G02F 1/035
[52] U.S. Cl. ........................ 385/2; 385/1; 385/3; 385/14; 385/130; 385/131; 385/132; 385/40
[58] Field of Search ................................ 385/1, 2, 3, 14, 385/15, 16, 40, 129, 130, 131, 141, 132

[56] References Cited

U.S. PATENT DOCUMENTS

| | | | |
|---|---|---|---|
| 4,850,667 | 7/1989 | Djupsjöbacka | 385/130 X |
| 4,867,516 | 9/1989 | Baken | 385/14 X |
| 4,904,037 | 2/1990 | Imoto et al. | 385/14 X |
| 5,015,053 | 5/1991 | Johnson | 385/11 X |
| 5,050,948 | 9/1991 | Hawkins, II et al. | 385/2 |
| 5,061,030 | 10/1991 | Miyamoto et al. | 385/3 |
| 5,185,823 | 2/1993 | Kaku et al. | 385/2 |
| 5,185,830 | 2/1993 | Nishimoto | 385/41 |
| 5,214,723 | 5/1993 | Zamkotsian | 385/2 |
| 5,214,724 | 5/1993 | Seino et al. | 385/2 |
| 5,291,565 | 3/1994 | Schaffner et al. | 385/3 |
| 5,404,412 | 4/1995 | Seino et al. | 385/2 |
| 5,473,711 | 12/1995 | Hakogi et al. | 385/14 |
| 5,479,552 | 12/1995 | Kitamura et al. | 385/132 |
| 5,526,448 | 6/1996 | Nagata et al. | 385/1 |
| 5,619,607 | 4/1997 | Djupsjobacka | 385/129 |
| 5,621,839 | 4/1997 | Asano et al. | 385/129 |

FOREIGN PATENT DOCUMENTS

| | | | |
|---|---|---|---|
| 0 652 457 | 5/1995 | European Pat. Off. | G02F 1/035 |
| 3-253815 | 11/1991 | Japan | G02F 1/035 |
| 5-61009 | 3/1993 | Japan | G02F 1/035 |
| 5-88125 | 4/1993 | Japan | 385/130 X |
| 5-78016 | 10/1993 | Japan | G02F 1/03 |
| 7-84228 | 3/1995 | Japan | G02F 1/035 |
| 8-54589 | 2/1996 | Japan | G02F 1/035 |
| 8-146367 | 6/1996 | Japan | G02F 1/035 |
| 9-269469 | 10/1997 | Japan | G02F 1/035 |

OTHER PUBLICATIONS

Nakajima, Hirochika, "Temperature–Stable, Low–Loss Ti:LiNbO₃ Devices", Integrated Optics and Optical Fiber Communication, Technical Digest, vol. 2 of 5, Jul. 19, 1989, pp. vii, 164–165.

Patent Abstracts of Japan, vol. 17, No. 669 (P–1657), Dec. 9, 1993 & JP 05 224164 A (Sumitomo Cement Co Ltd) Sep. 3, 1993.

Patent Abstracts of Japan, vol. 11, No. 274 (P–612), Sep. 5, 1987 & JP 62 073207 A (Fujitsu Ltd), Apr. 3, 1987 & JP 05 078 016 B (Fujitsu Ltd).

*Primary Examiner*—Brian Healy
*Attorney, Agent, or Firm*—Burns, Doane, Swecker & Mathis, L.L.P.

[57] ABSTRACT

An improved optical waveguide device having an optical waveguide for guiding a lightwave comprises, on a surface of a substrate having an electrooptical effect, at least a pair of electrodes composed of a hot electrode and a ground electrode which controls a guided lightwave, a buffer layer formed between the electrodes and the optical waveguide; further comprising an antistatic film which is formed on an upper surface of the buffer layer such that it comes into contact only with the hot electrode.

16 Claims, 6 Drawing Sheets

FIG. 2

FIG_3a

FIG_3b

FIG_6

OPTICAL WAVEGUIDE MODULATOR DEVICE

BACKGROUND OF THE INVENTION

1. Field of the Invention

The present invention relates to an optical waveguide device having an optical waveguide and electrodes for controlling a guided lightwave which are formed on a surface of a substrate which has an electrooptical effect, and more particularly to an improved optical waveguide device which can be operated stably against an ambient temperature change and the properties of the optical modulator are not affected by unevenness in electric conductivity of antistatic films for preventing unstable operation by pyroelectrically induced charge or the like.

The present invention also relates to an optical waveguide device which is capable of a high speed operation and utilizes a substrate with an electrooptical effect, more specifically, to a constitution for optical intensity modulators, optical phase modulators, polarization scramblers or the like which improves properties of long distance, optical fiber transmission.

2. Description of the Related Art

In recent fiber optics communication systems, a broad bandwidth, high capacity transmission of several GHz to several ten GHz at long distance of several thousand kilometers has been studied and such transmissions have been partially turning into practical use.

Under such circumstances, optical waveguide devices are studied as the key device. Since a lightwave is confined in a waveguide in an optical waveguide device, a high speed operation is possible and miniaturization, integration, complexation and the like can be easily attained. Furthermore, it has also been investigated to apply an optical waveguide device to optical measuring instruments, optical information processing or the like.

Among the optical waveguide devices, those having an optical waveguide formed by effecting a thermal diffusion of the Titanium (Ti) into a ferroelectric substrate such as $LiNbO_3$ (hereinafter simply referred to as LN) which has a great electrooptical effect are known and various investigations have been made on them. For an optical modulator utilizing such LN waveguide, it is relatively easy to suppress optical losses. Moreover, it has been proved that the optical modulator would have a modulation bandwidth of 10 GHz or more by constituting a hot electrode as a traveling-wave type electrode and thus, it is considered as a key device for realizing an super-high speed optical communication system.

Figure 4:
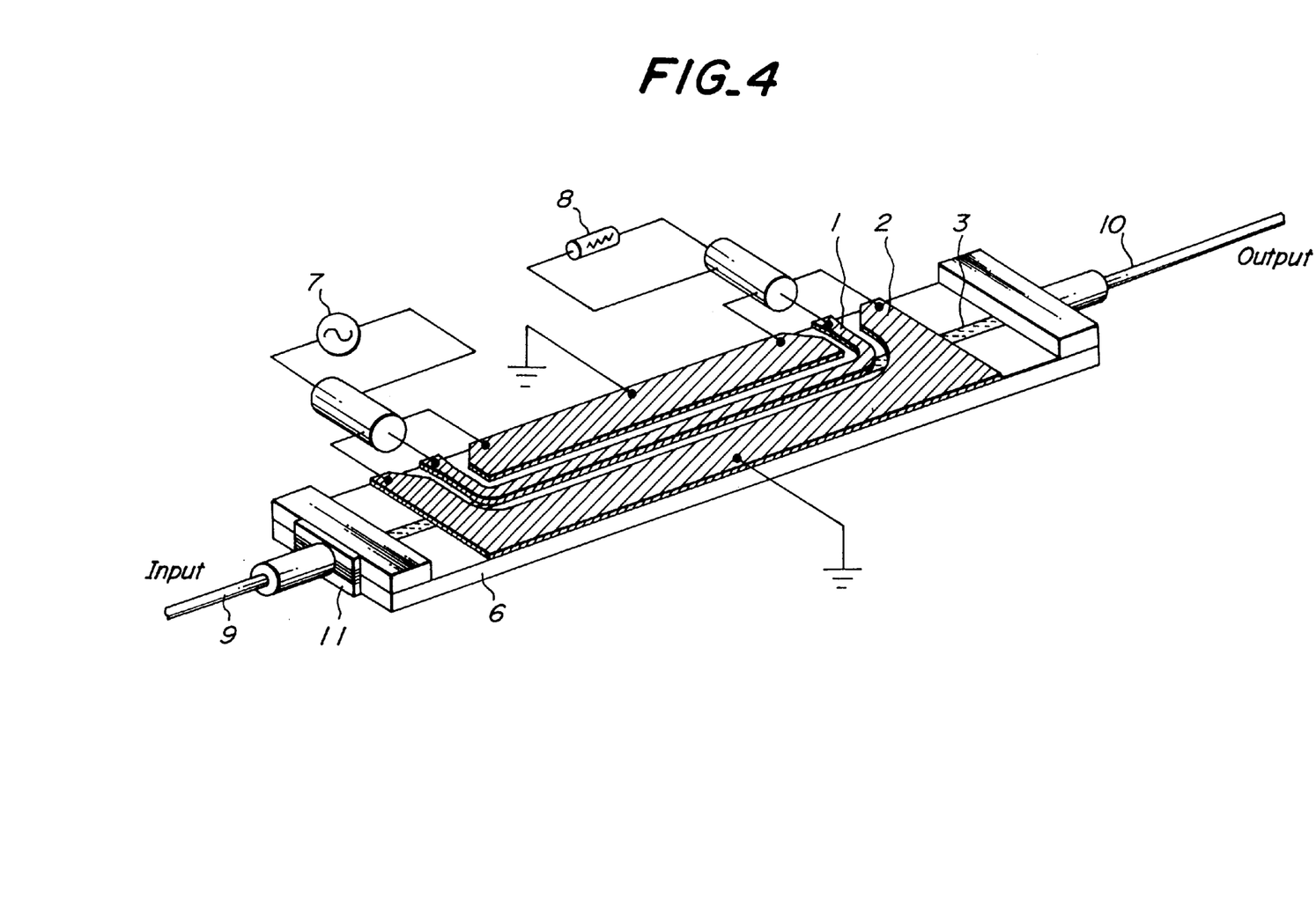
FIG. 4 is a perspective view depicting a structure of a Ti-diffused, LN waveguide optical phase modulator.

FIG. 4 is a perspective view showing a waveguide-type optical phase modulator as an example of Ti-diffused, LN waveguide-type optical modulators.

In this optical modulator, Ti is diffused into a surface of Z-cut LN substrate and a traveling-wave type electrodes are formed thereon. Although omitted from the illustration in FIG. 4, a buffer layer which is, for example, composed of $SiO_2$ is formed between a waveguide and the electrodes in order to prevent a guided lightwave from being absorbed in the metal electrodes.

To avoid operational fluctuations due to polarization change, an incident lightwave is polarized only one direction using a laminated micropolarizer lamipole (11), since the LN substrate is a large anisotropic crystal. The guided lightwave interacts with an electric field occurring due to microwave (electric signals) applied by a signal source (7), thereby changing the phase of guided lightwave.

For the purpose of further broadening the bandwidth, the electrodes are generally formed as a thick film in those modulators having a traveling-wave type electrodes. In other words, broadening of the bandwidth is attained by matching the propagation velocity of the guided lightwave with the velocity of the microwave traveling across the electrodes, namely, by velocity matching between the guided lightwave and the microwave. In general, such thick film electrodes are formed by an electroplating process.

Other than waveguide-type optical phase modulators, one example of which has been explained so far, mention may be made to branched interferometric-type optical intensity modulators in which two Y-branch waveguides are combined, as well as to polarization scramblers wherein a polarizer is arranged on the incident side of the optical phase modulator at an angle of 45 degrees with respect to the crystallographic axis.

Since a ferroelectric material is used as the substrate in these devices, they are likely to be pyroelectrically charged due to ambient temperature change, and what is worse, operation of the device becomes unstable because of such pyroelectrically induced charge.

The mechanism of such phenomenon will be explained below with reference to FIG. 5a and FIG. 5b.

Figure 5A:
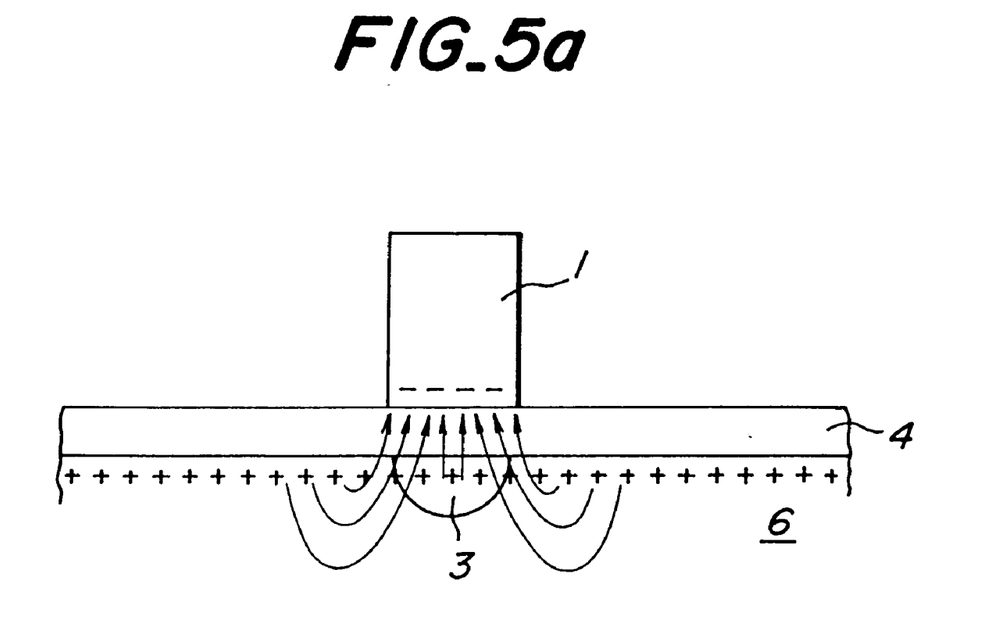
FIGS. 5a and 5b are sectional views for explaining effects of an antistatic film in a modulator.

In FIG. 5a, there is shown a structure in which no antistatic film is formed. In this case, an electric field caused by induced charges on the surface of a substrate (6) changes the refractive index of a waveguide (3) and thus, properties of the modulator become unstable with respect to ambient temperature change.

Figure 5B:
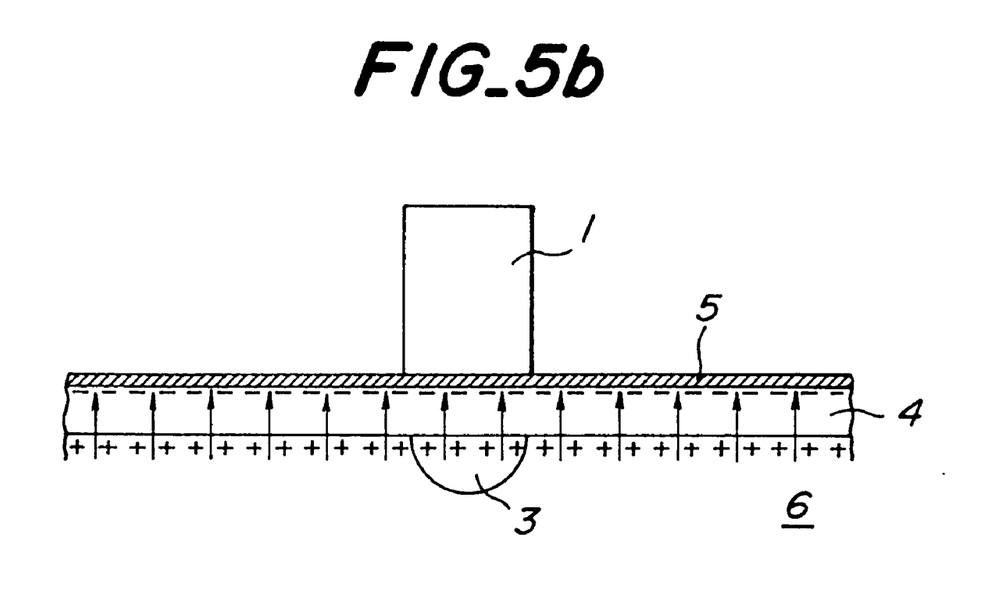

On the other hand, when an antistatic film (5) is formed as illustrated in FIG. 5(b), the electric field caused by the induced charges scarcely crosses the waveguide (3) and thus, the device can be quite stable against ambient temperature change.

Figure 3A:
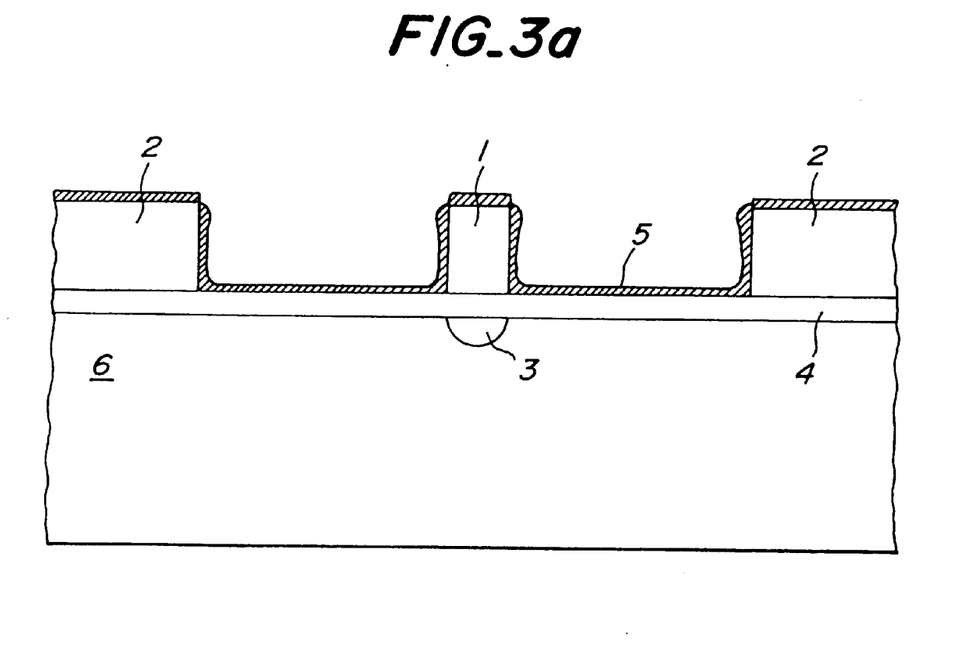
FIGS. 3a and 3b are sectional views respectively showing a structure of a prior art optical waveguide modulator.
Figure 3B:
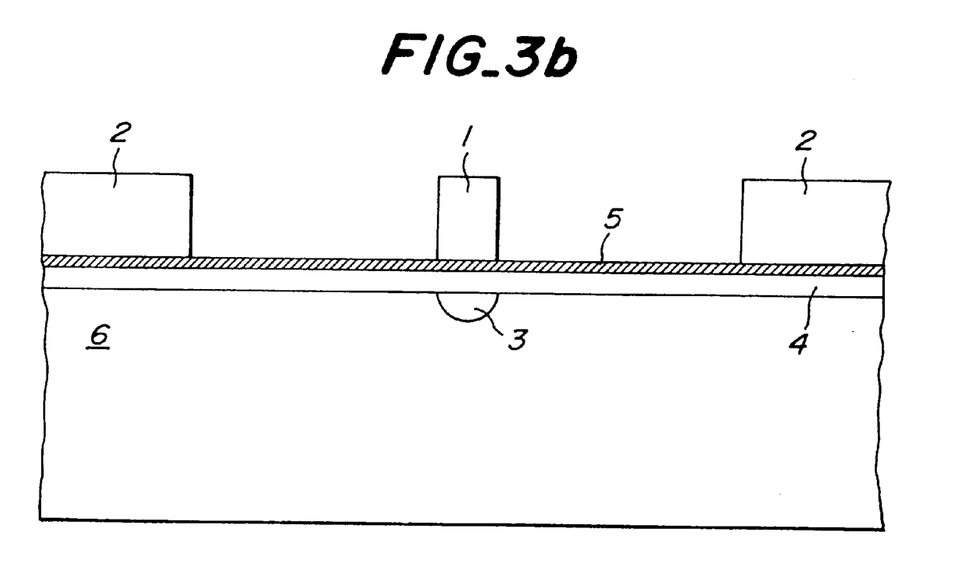

In Japanese Patent Publication No. 5-78016, for example, there have been proposed a constitution as shown in FIG. 3(a), wherein a waveguide (3) and a buffer layer (4) are formed on a surface of a LN substrate (6), and after forming coplanar electrodes (1) and (2) in the form of thick film, an antistatic film (5) is formed all over the surface, and a constitution as illustrated in FIG. 3(b) in which an antistatic film (5) is formed all over the surface of a buffer layer (4) before the formation of coplanar electrodes (1) and (2).

The above-mentioned two constitutions have such a common feature that the antistatic film (5) is always in contact with both of the hot electrode (1) and the ground electrode (2).

This feature is aimed to uniformly distribute the charges induced in the surface of the substrate between the electrodes, and is considered to be necessary for preventing unstableness in operation of the device.

However, the pyroelectric charge is not the only cause for unstableness in operation of the device. The electrode films which are formed thickly for broadening the bandwidth of the device have a quite large stress. Since this stress fluctuates in accordance with temperature change, an operating point acting on the waveguide may be shifted via the photoelastic effect of the LN substrate. In addition, other stresses such as thermal stress of the buffer layer formed on the surface of the substrate also act on the waveguide through the photoelastic effect of the substrate, thereby shifting the operating point. Accordingly, even a constitution in which an antistatic film is formed all over the surface of the substrate involves such a problem that the device cannot be operated stably against the ambient temperature change.

Material such as ITO and Si are generally used for the antistatic film (5), but the electric conductivity of these materials is greatly affected by a very little difference in contained impurities or manufacturing conditions (it easily changes by several hundred times to several thousand times). Since such film is in contact with both of the hot electrode (1) and the ground electrode (2), the resistance between the electrodes of the modulator may be greatly changed, thereby causing fluctuations in electrical properties.

Moreover, it is known that when an electric field is introduced into a semiconductive film such as the antistatic film, the electric field strength is weakened by the conductivity of the film. Accordingly, there is such a problem that when an antistatic film is widely formed between the electrodes (1), (2) and the buffer layer (4) as illustrated in FIG. 3b, the electric field occurring by applied microwave to the hot electrode (1) is decreased due to the conductivity of the antistatic film.

SUMMARY OF THE INVENTION

An object of the present invention is to solve the above-mentioned problems and to provide an optical waveguide device with an excellent temperature properties wherein fluctuations in electrical properties of the modulator as well as reduction of electric field by applied microwave are effectively suppressed.

Therefore, according to the present invention, an optical waveguide device comprises: an optical waveguide for guiding a lightwave; at least a pair of electrodes composed of a hot electrode and a ground electrode which control a guided lightwave; and a buffer layer formed between the electrodes and the optical waveguide, on a surface of a substrate having an electrooptical effect, and is characterized in that an antistatic film is formed on an upper surface of the buffer layer such that it comes into contact with the hot electrode.

The optical waveguide device according to the present invention may also be characterized in that the substrate, on which the optical waveguide is formed, is made of lithium niobate ($LiNbO_3$) and the optical waveguide is formed by effecting a thermal diffusion of titanium (Ti).

The optical waveguide device according to the present invention may further be characterized in that the antistatic film, which is in contact with the hot electrode, is composed of a semiconductive material.

The optical waveguide device according to the present invention may still further be characterized in that the antistatic film is made of a material selected from the group consisting of Ga, In, As, Al, B, Ge, Si, Sn and Sb or a compound thereof.

The optical waveguide device according to the present invention may also be characterized in that a gap (g) between the antistatic film and the ground electrode is set at such a value that is larger than zero and smaller than a distance (S) between the electrodes.

The optical waveguide device according to the present invention may still further be characterized in that the gap (g) between the antistatic film and the ground electrode is regulated such that it is possible to compensate a shift of operating point due to the thermal stress of the optical waveguide device with a shift of operating point due to an electric charge induced in a region of the substrate which locates right under the gap (g).

The optical waveguide device according to the present invention may still further be characterized in that the optical waveguide device constitutes one of intensity modulator, phase modulator and polarization scrambler.

In the optical waveguide device according to the present invention, the antistatic film (5) comes into contact only with the hot electrode (1) and is not in contact with the ground electrode (2). In addition, there is absolutely no antistatic film (5) between the ground electrode (2) and the buffer layer (4).

Furthermore, the gap (g) between the antistatic film (5) and the ground electrode (2) may be adjusted so that it is possible to compensate a shift of operating point due to the thermal stress of the optical waveguide device with a shift of operating point due to an electric charge induced in a region of the substrate (6) which locates right under the gap (g) in the optical waveguide device according to the present invention.

Accordingly, the device of the present invention is different from the conventional devices in such points that the antistatic film (5) neither comes into contact with both of the hot electrode (1) and the ground electrode (2) nor exists on the entire surface between the electrodes (1), (2) and the buffer layer (4).

The antistatic film (5), whose electric conductivity is greatly affected by a very little difference in contained impurities or manufacturing conditions, may cause fluctuations in electrical properties of the optical modulators.

This is due to such structure in which the antistatic film (5) whose electric conductivity is greatly affected by differences in manufacturing conditions is arranged such that it comes into contact with both of the hot electrode (1) and the ground electrode (2), thereby greatly changing the resistance between the electrodes of the optical modulator.

Figure 1:
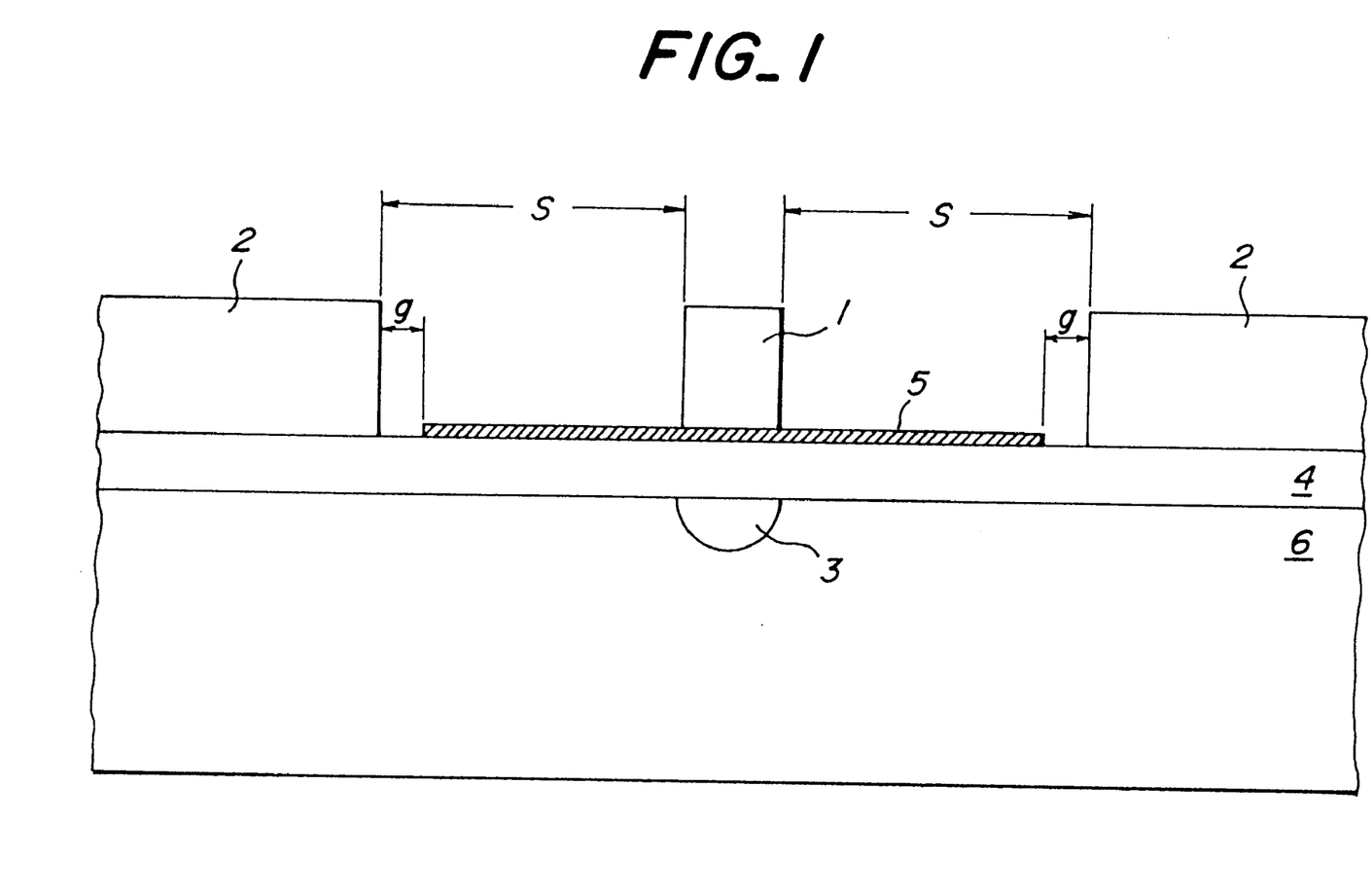
FIG. 1 is a sectional view showing a structure of the optical waveguide modulator according to an embodiment of the present invention.

To solve this problem, the antistatic film (5) may be arranged such that it does not extend so far as to contact with ground electrode (2) as shown in FIG. 1. Due to such a constitution, in other words, since the antistatic film (5) is not in contacted state between the hot electrode (1) and the ground electrode (2), the resistance between the electrodes of the optical modulator is remarkably more stable and thus the electrical properties thereof is less influenced when compared with the case where the antistatic film (5) is in contact with both of the hot electrode (1) and the ground electrode (2) even when the electric conductivity of the antistatic film (5) fluctuates.

When a semiconductive film such as an antistatic film is widely formed between the electrodes (1), (2) and the buffer layer (4) as illustrated in FIG. 3b, the electric field occurring by applied microwave to the hot electrode (1) is decreased due to the conductivity of the antistatic film. However, by eliminating the antistatic film (5) between the ground electrode (2) and the buffer layer (4), the electric field introduced in the antistatic film is reduced by half and thus, the reduction of the electric field by applied microwave can be cut in almost half.

Such disadvantage that the device cannot be operated stably against the ambient temperature change may be solved as follows.

Since thermal stress of the electrode films which are formed thickly for broadening the bandwidth of the device or that of the buffer layer formed on the surface of the substrate acts on the waveguide via the photoelastic effect of the substrate, thereby shifting the operating point, the device cannot attain a stable temperature property by only forming an antistatic film (5). Therefore, the present invention solves this problem by constituting the optical waveguide device such that the shift of operating point due to the thermal stress and the shift of operating point due to the electric charge would compensate each other.

Figure 6:
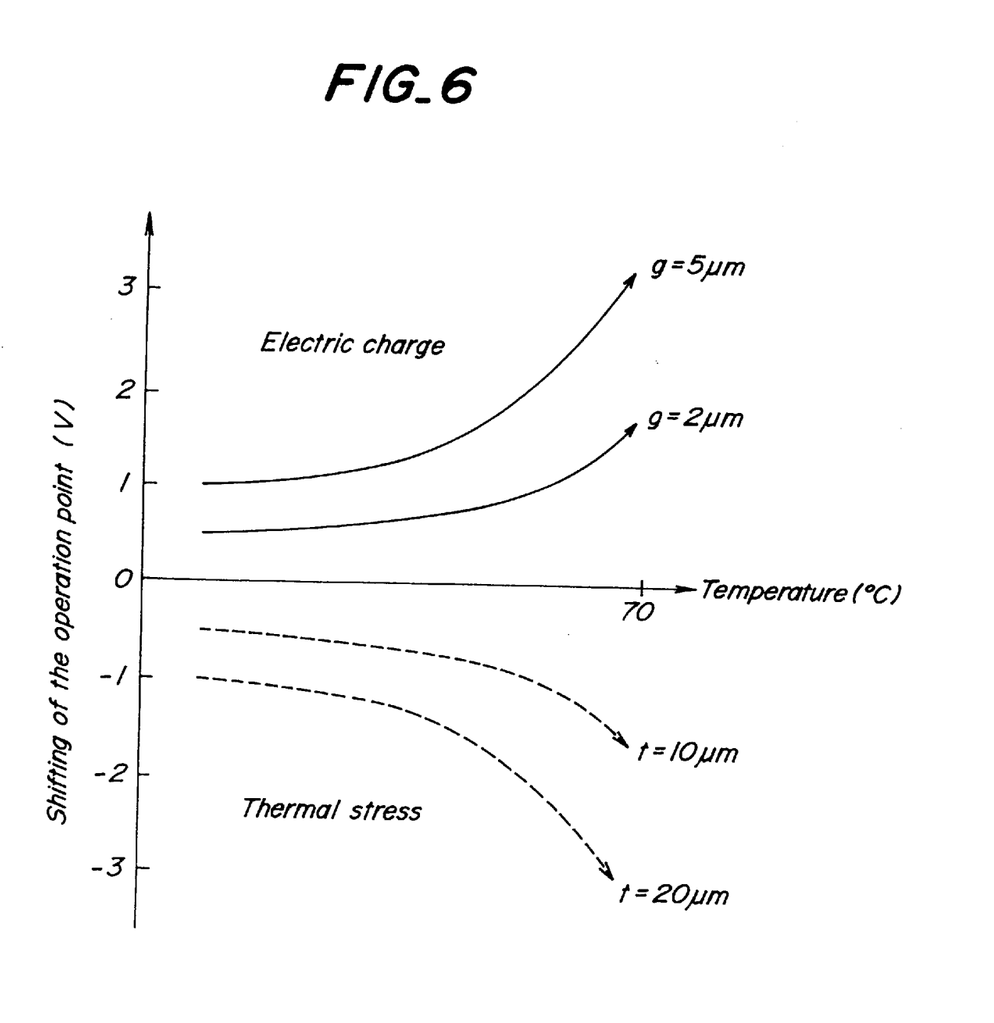
FIG. 6 is a diagram illustrating a shift of the operating point due to the thermal stress in accordance with temperature change and a shift of operating point due to the electric charge in accordance with temperature change.

In FIG. 6, there are shown respective examples of shifting of the operation point due to thermal stress occurred in accordance with the temperature change and the shifting of the operation point due to electric charge induced in accordance with the temperature change. Greatness and direction (whether it shifts toward the plus direction or toward the minus direction) of the shifting of the operating point caused by the thermal stress may change depending on thickness of the thickly formed electrode, degree of the stresses of the buffer layer or the like formed on the surface of the substrate, kind of such stresses, i.e. whether it is a compression stress or a tensile stress, material of a case which is used for mounting the substrate (6), mounting method employed therefor and the like. The thickly formed electrode film has the greatest influence among them and thus, the greatness and direction of the shifting of the operating point due to the thermal stress may change in accordance with the thickness of the electrode film.

On the other hand, greatness and direction of the shifting of the operating point caused by the electric charge may change depending on the gap (g) between the antistatic film (5) and the ground electrode (2), relative positions of the waveguide (3) and the gap (g), polarity of the used substrate (6) (for example, whether it is a +Z surface or –Z surface) and the like. Among them, the gap (g) has the greatest influence and thus, the greatness and direction of the shifting of the operating point due to the electric charge may change in accordance with the greatness of the gap (g).

In this connection, in a case where the shift of the operating point caused by the thermal stress in accordance with the increase of ambient temperature as shown in FIG. 6 is heading the minus direction, the greatness of the gap (g), relative positions of the waveguide (3) and the gap (g), and the polarity of the used substrate (6) are adjusted so that the shift of operating point due to the electric charge induced in a region of the substrate which locates right under said gap (g) would head the plus direction by the same greatness as that of the shift due to the thermal stress. By such adjustment, the respective shifts of the operating point due to the temperature change may be compensated by each other, thereby enabling the device to be operated stably against the ambient temperature change.

As the measure for compensation, adjustment of the gap (g) between the antistatic film (5) and the ground electrode (2) is more preferable than adjustment of relative positions of the waveguide (3) and the gap (g), because it can be easily adjusted by designing a photomask and has good reproducibility as well as a large adjustment range.

Incidentally, similar adjustments are possible in a case where the shift of the operating point caused by the thermal stress is heading the plus direction.

In the vicinity of the hot electrode (1), as illustrated in FIG. 5b, the electric charges induced in accordance with the temperature change in the surface of the substrate (6) are offset by adverse electric charges supplied through the antistatic film (5) and the hot electrode (1) being in contact therewith. As a result, no electric field crosses the waveguide (3) and thus, the shifting of operating point due to the electric charge can be suppressed by a great extent.

Accordingly, by constituting the optical waveguide device such that the antistatic film (5) comes into contact only with the hot electrode (1) and is not in contact with the ground electrode (2); there is absolutely no antistatic film between the ground electrode (2) and the buffer layer (4); and the gap (g) between the antistatic film (5) and the ground electrode (2) is adjusted so that a shift of operating point due to the thermal stress is compensated with a shift of operating point due to an electric charge induced in a region of the substrate (6) right under the gap (g), fluctuations in electrical properties of the device and reduction of electric field by applied microwave can be effectively suppressed, thereby stabilizing the operation of the device against the temperature change.

BRIEF DESCRIPTION OF THE DRAWINGS

The present invention will be explained hereinafter in further detail by way of preferred embodiments with reference to the attached drawings.

DESCRIPTION OF THE PREFERRED EMBODIMENTS

Referring to FIG. 1, there is shown a structure of the optical waveguide modulator according to an embodiment of the present invention.

In this figure is illustrated a waveguide-type optical phase modulator having a waveguide (3) which is formed by effecting a thermal diffusion of Ti into a Z-cut $LiNbO_3$ substrate (hereinafter simply referred to as LN substrate) (6).

First of all, a waveguide (3) is formed by effecting a patterning of a Ti-deposited layer having a thickness of 800 Å and a width of 8 $\mu$m in a predetermined position on the LN substrate (6) and then giving a heating of 10 hours with a temperature of 1000° C. to effect a thermal diffusion of the Titanium into the substrate. After that, a $SiO_2$ buffer layer (4) having a thickness of 0.5 $\mu$m is formed all over the substrate by sputtering process for preventing a guided lightwave from being absorbed in a metal electrode.

Then, in order to form an antistatic film (5) having a width that does not come into contact with a ground electrode (2) and leaves a gap (g) of 5 $\mu$m between the antistatic film (5) and the ground electrode (2), a patterning by photoresist is effected on the LN substrate (6) with the buffer layer, and after forming a film of Si thereon as the antistatic film by 1000 Å sputtering process, a lift-off process is conducted.

The gap (g) may be set at such a value that is larger than zero and smaller than the distance (S) between the electrodes so that the antistatic film (5) would not come into contact with the ground electrode (2).

Since the stress in the thickly formed film electrodes (1) and (2) changes in accordance with the thickness of the electrode films, the value of the gap (g) is selected such that the shifting of the operating point due to the thermal stress would be compensated thereby, for instance, when the thickness of the electrode (t) is set at 10 μm, the gap (g) would be set at 2 μm, and when t=20 μm, the gap (g) would be adjusted to 5 μm as shown in FIG. 6.

Although Si is used for the antistatic film in the above-explained embodiment, any material having a function of preventing pyroelectric charge can be used therefor.

For example, when Sn is used for the antistatic film (5), the film may be formed to have a larger thickness of 2000 Å, because the electric conductivity of Sn is lower than that of Si.

Semiconductive materials, especially those selected from the group consisting of Ga, In, As, Al, B, Ge, Si, Sn and Sb as well as compounds thereof are preferable, since their electric conductivity can be greatly changed by varying combination or composition thereof, they are easily formed into a film and widely used as semiconductive materials.

In this case, thickness of the antistatic film may be adjusted mainly in accordance with its electric conductivity. However, it is preferable for the film to have a thickness larger than 100 Å, because the continuity of the film may be deteriorated when the film is formed thinner than such value. On the other hand, when the film is formed too thick, the absorption of the electric filed by applied microwave may unfavorably increase. Accordingly, the antistatic film may preferably be formed not to have a thickness larger than about 2 μm.

After the formation of this antistatic film, Ti and Au are vapor deposited all over the surface of the substrate in order to form the hot electrode (1) and the ground electrode (2) by electroplating in the shape of thick films. Although Ti is not shown in the figure, it is used as glue for heightening the adhesive force of the Au electrode. By electroplating with use of a thickly formed photoresist of the electrode pattern, the hot electrode (1) and the ground electrode (2) in the form of a thick film having a thickness of 15 μm are formed on the substrate covered with the vapor deposited Ti and Au. After removing the photoresist with an organic solvent, excess Ti and Au are removed by dry etching or chemical etching.

In the optical modulator having the above-described structure, the antistatic film (5) arranged between the hot electrode (1) and the ground electrode (2) comes into contact only with the hot electrode (1) and is not in contact with the ground electrode (2). Accordingly, even when the electric conductivity of the antistatic film (5) fluctuates, the resistance between the electrodes of the modulator can stay unchanged, thereby not affecting the electrical properties of the modulator.

Figure 2:
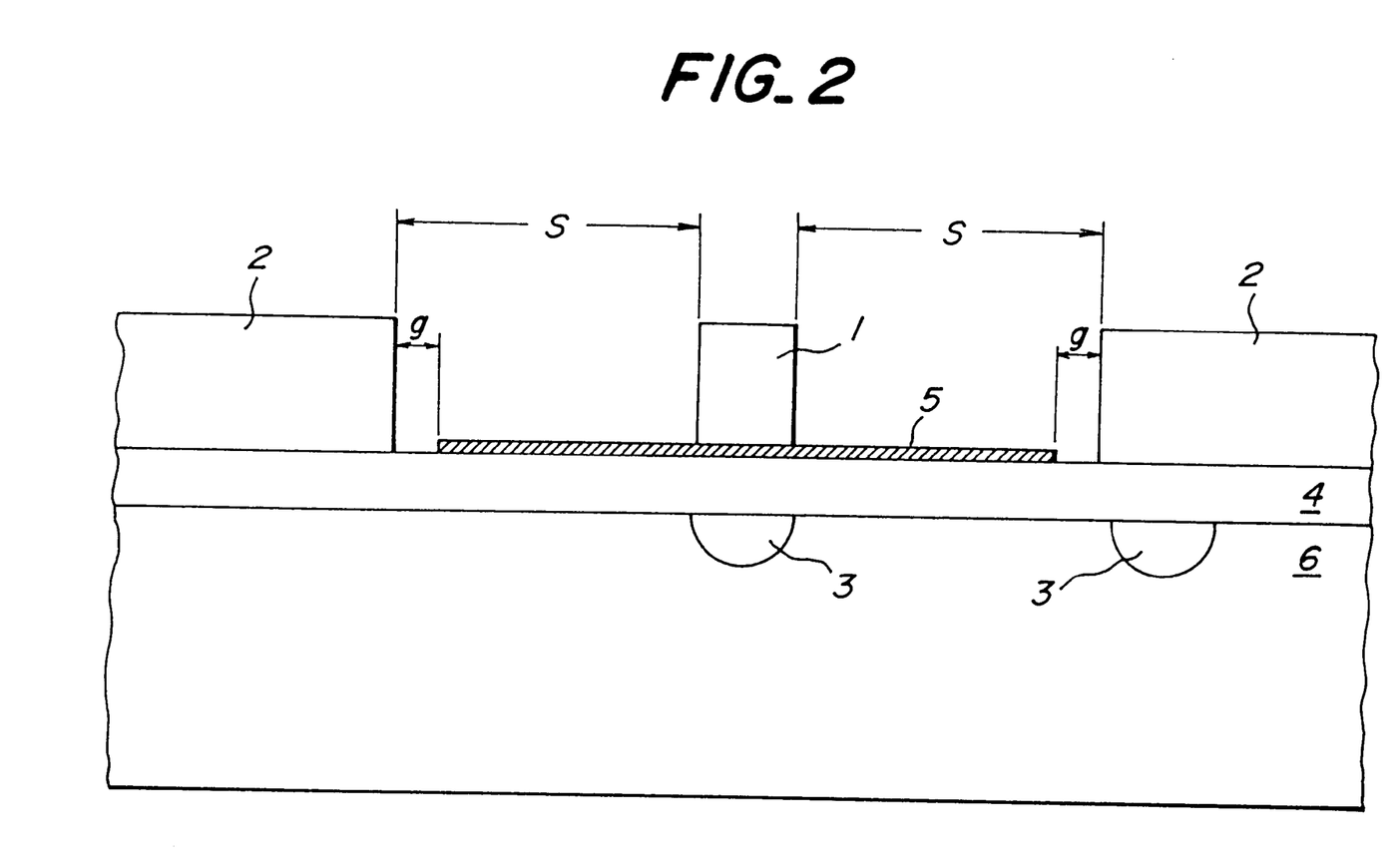
FIG. 2 is a sectional view illustrating a structure of the optical waveguide modulator according to another embodiment of the present invention.

In FIG. 2, there is illustrated a structure of the optical waveguide device according to another embodiment of the present invention. This device is a waveguide-type optical intensity modulator (Mach-Zehnder type) and can be produced in the same manner as explained in the case of the optical phase modulator. In the intensity modulator of this type, two Y-branched waveguide are combined such that the lightwave is modulated through branching, phase modulation and combined interference. With respect to such waveguide-type optical intensity modulator, having such a structure in which the antistatic film (5) arranged between the hot electrode (1) and the ground electrode (2) comes into contact only with the hot electrode (1) and is not in contact with the ground electrode (2) may result in an improved optical waveguide device wherein fluctuations in electrical modulation characteristics are reduced, thereby realizing excellent temperature properties.

Although, in the above embodiments, the explanation is given by way of an optical waveguide-type phase modulator and optical waveguide-type intensity modulator in which a waveguide is formed by effecting a thermal diffusion of the Ti into a Z-cut LN substrate, any substrate can be used in the present invention as long as it has an electrooptical effect, and it is evident that the present invention does not owe to the method for forming the waveguide or the crystal orientation of the substrate.

Incidentally, as optical waveguide-type modulators other than phase modulators and intensity modulators, the present invention is applicable to polarization scramblers and the like.

As described above, according to the present invention, there can be provided an optical waveguide device wherein fluctuations in electrical modulation characteristics of the device is effectively suppressed, thereby realizing an excellent temperature properties and suppressed reduction in electric field by applied microwave.

Although the invention has been described with reference to specific preferred embodiments, they were given by way of examples only and thus, it should be noted that various changes and modifications may be made on them without departing from the scope of the present invention as defined by the appended claims.

What is claimed is:

1. An optical waveguide device comprising on a surface of a substrate made of lithium niobate having an electrooptical effect, an optical waveguide formed by effecting a thermal diffusion of titanium (Ti) for guiding a lightwave, at least a pair of electrodes composed of a hot electrode and a ground electrode which control a guided lightwave, a buffer layer formed between said electrodes and said optical waveguide, further comprising an antistatic film which is formed on an upper surface of said buffer layer such that said antistatic layer comes into contact only with said hot electrode, said antistatic film being made of a material selected from the group consisting of Ga, In, As, Al, B, Ge, Si, Sn, Sb and compounds thereof.

2. The optical waveguide device as set forth in claim 1, wherein a gap (g) between said antistatic film and said ground electrode is set at such a value that is larger than zero and smaller than a distance (S) between the electrodes.

3. The optical waveguide device as set forth in claim 2, wherein the gap (g) between said antistatic film and said ground electrode is regulated such that it is possible to compensate a shift of operating point due to the thermal stress of the optical waveguide device with a shift of operating point due to an electric charge induced in a region of the substrate which locates right under said gap (g).

4. The optical waveguide device as set forth in claim 1, wherein said optical waveguide device constitutes one of intensity modulator, phase modulator and polarization scrambler.

5. The optical waveguide device as set forth in claim 1, wherein said antistatic film, which is in contact with said hot electrode, is composed of a semiconductive material.

6. An optical waveguide device comprising on a surface of a substrate having an electrooptical effect, an optical waveguide for guiding a lightwave, at least a pair of electrodes composed of a hot electrode and a ground electrode which control a guided lightwave, a buffer layer formed between said electrodes and said optical waveguide, further comprising an antistatic film which is formed on an upper surface of said buffer layer such that said antistatic layer comes into contact only with said hot electrode, said antistatic film being made of a material selected from the group consisting of Ga, In, As, Al, B, Ge, Si, Sn, Sb and compounds thereof.

7. The optical waveguide device as set forth in claim 5, wherein a gap (g) between said antistatic film and said ground electrode is set at such a value that is larger than zero and smaller than a distance (S) between the electrodes.

8. The optical waveguide device as set forth in claim 6, wherein a gap (g) between said antistatic film and said ground electrode is set at such a value that is larger than zero and smaller than a distance (S) between the electrodes.

9. An optical waveguide device comprising on a surface of a substrate having an electrooptical effect, an optical waveguide for guiding a lightwave, at least a pair of electrodes composed of a hot electrode and a ground electrode which control a guided lightwave, a buffer layer formed between said electrodes and said optical waveguide, further comprising an antistatic film which is formed on an upper surface of said buffer layer such that said antistatic layer comes into contact only with said hot electrode and a gap (g) between said antistatic film and said ground electrode which is set at such a value that is larger than zero and smaller than a distance (S) between the electrodes.

10. The optical waveguide device as set forth in claim 5, wherein a gap (g) between said antistatic film and said ground electrode is regulated such that it is possible to compensate a shift of operating point due to the thermal stress of the optical waveguide device with a shift of operating point due to an electric charge induced in a region of the substrate which locates right under said gap (g).

11. The optical waveguide device as set forth in claim 6, wherein the gap (g) between said antistatic film and said ground electrode is regulated such that it is possible to compensate a shift of operating point due to the thermal stress of the optical waveguide device with a shift of operating point due to an electric charge induced in a region of the substrate which locates right under said gap (g).

12. The optical waveguide device as set forth in claim 7, wherein the gap (g) between said antistatic film and said ground electrode is regulated such that it is possible to compensate a shift of operating point due to the thermal stress of the optical waveguide device with a shift of operating point due to an electric charge induced in a region of the substrate which locates right under said gap (g).

13. The optical waveguide device as set forth in claim 8, wherein the gap (g) between said antistatic film and said ground electrode is regulated such that it is possible to compensate a shift of operating point due to the thermal stress of the optical waveguide device with a shift of operating point due to an electric charge induced in a region of the substrate which locates right under said gap (g).

14. The optical waveguide device as set forth in claim 9, wherein the gap (g) between said antistatic film and said ground electrode is regulated such that it is possible to compensate a shift of operating point due to the thermal stress of the optical waveguide device with a shift of operating point due to an electric charge induced in a region of the substrate which locates right under said gap (g).

15. The optical waveguide device as set forth in claim 1, wherein a gap (g) between said antistatic film and said ground electrode is regulated such that it is possible to compensate a shift of operating point due to the thermal stress of the optical waveguide device with a shift of operating point due to an electric charge induced in a region of the substrate which locates right under said gap (g).

16. An optical waveguide device comprising on a surface of a substrate having an electrooptical effect, an optical waveguide for guiding a lightwave, at least a pair of electrodes composed of a hot electrode and a ground electrode which control a guided lightwave, a buffer layer formed between said electrodes and said optical waveguide, further comprising an antistatic film which is formed on an upper surface of said buffer layer such that said antistatic layer comes into contact only with said hot electrode and a gap (g) between said antistatic film and said ground electrode which is regulated such that it is possible to compensate a shift of operating point due to the thermal stress of the optical waveguide device with a shift of operating point due to an electric charge induced in a region of the substrate which locates right under said gap (g).

* * * * *